United States Patent
Tamura et al.

(10) Patent No.: US 9,490,495 B2
(45) Date of Patent: Nov. 8, 2016

(54) HYDROGEN GENERATOR, FUEL CELL SYSTEM, AND METHOD OF OPERATING HYDROGEN GENERATOR

(71) Applicant: PANASONIC CORPORATION, Osaka (JP)

(72) Inventors: Yoshio Tamura, Hyogo (JP); Koichi Kusumura, Osaka (JP); Hirofumi Kokubu, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 363 days.

(21) Appl. No.: 14/114,186

(22) PCT Filed: Jan. 5, 2013

(86) PCT No.: PCT/JP2013/000123
§ 371 (c)(1),
(2) Date: Oct. 25, 2013

(87) PCT Pub. No.: WO2013/128785
PCT Pub. Date: Sep. 6, 2013

(65) Prior Publication Data
US 2014/0050996 A1 Feb. 20, 2014

(30) Foreign Application Priority Data
Mar. 2, 2012 (JP) .................................. 2012-046919

(51) Int. Cl.
*C01B 3/58* (2006.01)
*H01M 8/04* (2016.01)
(Continued)

(52) U.S. Cl.
CPC .............. *H01M 8/0675* (2013.01); *C01B 3/38* (2013.01); *C01B 3/58* (2013.01); *H01M 8/04231* (2013.01);
(Continued)

(58) Field of Classification Search
CPC ............... C01B 2203/0244; C01B 2203/025; C01B 2203/0283; C01B 2203/066; C01B 2203/0811; C01B 2203/1235; C01B 2203/127; C01B 2203/148; C01B 2203/1609; C01B 3/38; C01B 3/58; H01M 8/04776; H01M 8/04955; H01M 8/0612; H01M 8/0675; H01M 8/04231; Y02E 60/50
See application file for complete search history.

(56) References Cited

U.S. PATENT DOCUMENTS

2008/0311444 A1    12/2008  Nakamura et al.
2012/0040256 A1    2/2012   Kani et al.
(Continued)

FOREIGN PATENT DOCUMENTS

EP    1538126 A1    6/2005
JP    5-114414 A    5/1993
(Continued)

OTHER PUBLICATIONS

Extended European Search Report dated Feb. 2, 2015, issued in corresponding European Patent Application No. 13755410.1. 8 pgs.
International Search Report for International Application No. PCT/JP2013/000123 mailed Apr. 23, 2013, with English translation, 2 pgs.

*Primary Examiner* — Carlos Barcena
*Assistant Examiner* — Lilia V Nedialkova
(74) *Attorney, Agent, or Firm* — McDermott Will & Emery LLP

(57) ABSTRACT

A hydrogen generator includes: a reformer configured to generate a hydrogen-containing gas by a reforming reaction using a material gas; a hydro-desulfurizer configured to remove a sulfur compound in the material gas; a material gas passage through which the material gas supplied to the reformer flows; a recycled gas passage connected between a first connection portion of a gas passage located downstream of the reformer and a second connection portion of the material gas passage located upstream of the hydro-desulfurizer; a first on-off valve disposed on the recycled gas passage; a second on-off valve disposed on the material gas passage between the second connection portion and the hydro-desulfurizer; and a controller configured to open the first on-off valve, after generation stop of the hydrogen-containing gas, to supply the material gas to the recycled gas passage, and to close the second on-off valve when the controller opens the first on-off valve.

14 Claims, 9 Drawing Sheets

(51) Int. Cl.
*H01M 8/06* (2016.01)
*C01B 3/38* (2006.01)

(52) U.S. Cl.
CPC ..... *H01M 8/04776* (2013.01); *H01M 8/04955* (2013.01); *H01M 8/0612* (2013.01); *C01B 2203/025* (2013.01); *C01B 2203/0244* (2013.01); *C01B 2203/0283* (2013.01); *C01B 2203/066* (2013.01); *C01B 2203/0811* (2013.01); *C01B 2203/127* (2013.01); *C01B 2203/1235* (2013.01); *C01B 2203/148* (2013.01); *C01B 2203/1609* (2013.01); *Y02E 60/50* (2013.01)

(56) References Cited

U.S. PATENT DOCUMENTS

2012/0178006 A1   7/2012   Kani et al.
2013/0108937 A1   5/2013   Takebe et al.

FOREIGN PATENT DOCUMENTS

| JP | 2006-092764 A | 4/2006 |
| JP | 2009-227479 A | 10/2009 |
| WO | 2011/077753 A1 | 6/2011 |
| WO | 2012/004963 A1 | 1/2012 |

HYDROGEN GENERATOR, FUEL CELL SYSTEM, AND METHOD OF OPERATING HYDROGEN GENERATOR

RELATED APPLICATIONS

This application is the U.S. National Phase under 35 U.S.C. §371 of International Application No. PCT/JP2013/000123, filed on Jan. 15, 2013, which in turn claims the benefit of Japanese Application No. 2012-046919, filed on Mar. 2, 2012, the disclosures of which are incorporated by reference herein.

TECHNICAL FIELD

The present invention relates to a hydrogen generator, a fuel cell system, and a method of operating the hydrogen generator.

BACKGROUND ART

An infrastructure for supplying a hydrogen-containing gas used as a fuel at the time of power generation is not developed as a typical material infrastructure, so that a fuel cell system typically includes a hydrogen generator including a reformer configured to generate a hydrogen-containing gas from a natural gas or LPG supplied from the typical material infrastructure.

In the reformer, a steam-reforming reaction is typically used. In the steam-reforming reaction, for example, a city gas and steam that are materials are caused to react with each other at a high temperature of about 600 to 700° C. by using a precious metal-based reforming catalyst, such as a Ni-based reforming catalyst or a Ru-based reforming catalyst. Thus, the hydrogen-containing gas containing hydrogen as a major component is generated.

A material gas, such as the city gas, contains a sulfur compound. Since the sulfur compound is a poisoning material especially for the reforming catalyst, it has to be removed in some way. As one removing method, there is a hydrogen generator configured to remove the sulfur compound by hydrodesulfurization using a recycled hydrogen-containing gas.

Here, a hydrogen generator has been proposed, which stabilizes the supply of a recycled gas in such a manner that a hydrogen-containing gas is stored for a predetermined period of time in a gas-filled portion of a gas-filled container disposed on a recycled gas passage used for recycling, and then the hydrogen-containing gas is mixed with a material (for example, PTL 1).

CITATION LIST

Patent Literature

PTL 1: Japanese Laid-Open Patent Application Publication No. 2006-092764

SUMMARY OF INVENTION

Technical Problem

A problem of the generation of condensed water in a recycled gas passage after the generation stop of a hydrogen-containing gas in a hydrogen generator including a conventional hydro-desulfurizer has not been discussed.

The present invention was made to solve the above conventional problem, and an object of the present invention is to provide a hydrogen generator, a fuel cell system, and a method of operating the hydrogen generator, each of which makes the amount of condensed water generated in the recycled gas passage after the generation stop of the hydrogen-containing gas smaller than conventional cases.

Solution to Problem

In order to solve the above problems, a hydrogen generator according to one aspect of the present invention includes: a reformer configured to generate a hydrogen-containing gas by a reforming reaction using a material gas; a hydro-desulfurizer configured to remove a sulfur compound in the material gas; a recycled gas passage through which the hydrogen-containing gas added to the material gas before the material gas flows into the hydro-desulfurizer flows; a first on-off valve disposed on the recycled gas passage; a material gas passage through which the material gas supplied to the reformer flows; a second on-off valve disposed on a portion of the material gas passage, the portion being located downstream of a connection portion where the material gas passage and the recycled gas passage are connected to each other; and a controller configured to open the first on-off valve after generation stop of the hydrogen-containing gas to supply the material gas to the recycled gas passage, wherein the controller closes the second on-off valve when it opens the first on-off valve.

A method of operating a hydrogen generator according to one aspect of the present invention includes: generating a hydrogen-containing gas in a reformer by a reforming reaction using a material gas; removing a sulfur compound from the material gas to which the hydrogen-containing gas is added through a recycled gas passage, by causing the material gas to flow through a hydro-desulfurizer; stopping generating the hydrogen-containing gas; and opening a first on-off valve disposed on the recycled gas passage after the generation stop of the hydrogen-containing gas to supply the material gas to the recycled gas passage, wherein when the first on-off valve is opened, a second on-off valve disposed on a portion of a material gas passage through which the material gas supplied to the reformer flows is closed, the portion being located downstream of a connection portion where the material gas passage and the recycled gas passage are connected to each other.

Advantageous Effects of Invention

According to one aspect of the present invention, the amount of condensed water generated in the recycled gas passage is made smaller than those of conventional cases, so that the water clogging of the recycled gas passage is suppressed.

DESCRIPTION OF EMBODIMENTS

Figure 1:
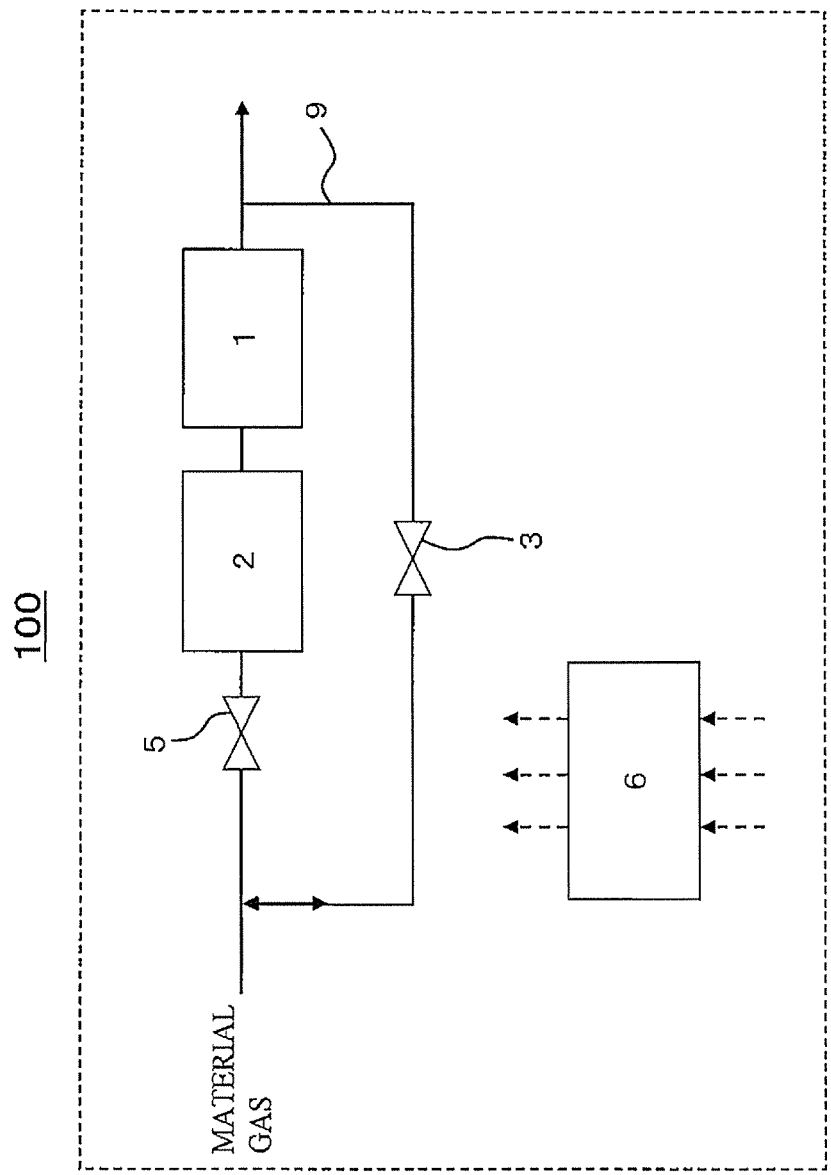
FIG. 1 is a conceptual diagram showing one example of a schematic configuration of a hydrogen generator according to Embodiment 1.

The present inventors have diligently studied the problem of the generation of the condensed water in the recycled gas passage after the generation stop of the hydrogen-containing gas, and have obtained the following findings.

A recycled gas flowing through the recycled gas passage contains steam. In a case where the temperature of the recycled gas passage decreases when the hydrogen generator stops operating, the condensation of the steam contained in the recycled gas occurs. Therefore, condensed water accumulates in the recycled gas passage, and this may causes clogging of the recycled gas passage.

Embodiment 1

A hydrogen generator according to Embodiment 1 includes: a reformer configured to generate a hydrogen-containing gas by a reforming reaction using a material gas; a hydro-desulfurizer configured to remove a sulfur compound in the material gas; a recycled gas passage through which the hydrogen-containing gas added to the material gas before the material gas flows into the hydro-desulfurizer flows; a first on-off valve disposed on the recycled gas passage; a material gas passage through which the material gas supplied to the reformer flows; a second on-off valve disposed on a portion of the material gas passage, the portion being located downstream of a connection portion where the material gas passage and the recycled gas passage are connected to each other; and a controller configured to open the first on-off valve after generation stop of the hydrogen-containing gas to supply the material gas to the recycled gas passage, wherein the controller closes the second on-off valve when it opens the first on-off valve.

A method of operating a hydrogen generator according to Embodiment 1 comprising: generating a hydrogen-containing gas in a reformer by a reforming reaction using a material gas; removing a sulfur compound from the material gas to which the hydrogen-containing gas is added through a recycled gas passage, by causing the material gas to flow through a hydro-desulfurizer; stopping generating the hydrogen-containing gas; and opening a first on-off valve disposed on the recycled gas passage after the generation stop of the hydrogen-containing gas to supply the material gas to the recycled gas passage, wherein when the first on-off valve is opened, a second on-off valve disposed on a portion of a material gas passage through which the material gas supplied to the reformer flows is closed, the portion being located downstream of a connection portion where the material gas passage and the recycled gas passage are connected to each other.

According to this configuration, the amount of condensed water generated in the recycled gas passage is made smaller than those of conventional hydrogen generators, so that water clogging of the recycled gas passage is suppressed. The reason for this is as follows.

By supplying the material gas to the recycled gas passage after the generation stop of the hydrogen-containing gas, the hydrogen-containing gas in the recycled gas passage is discharged. With this, the amount of steam contained in the gas in the recycled gas passage decreases. Therefore, the amount of condensed water generated in accordance with the decrease in temperature of the recycled gas passage is made smaller than those of the conventional hydrogen generators, so that the water clogging of the recycled gas passage is suppressed.

Moreover, the amount of steam in the recycled gas passage can be reduced more quickly than a case where the second on-off valve is not closed. The reason for this is as follows. In a case where both the first on-off valve and the second on-off valve are opened, and the material gas is supplied to the recycled gas passage, the gas having flowed through the reformer is supplied to the recycled gas passage. Since the hydrogen-containing gas containing steam exists in the reformer, the gas containing steam flows into the recycled gas passage. On the other hand, in a case where the first on-off valve is opened, and the second on-off valve is closed, and the material gas is supplied to the recycled gas passage, the hydrogen-containing gas having flowed through the reformer does not flow into the recycled gas passage, but the material gas flows into the recycled gas passage from the material gas passage through the above connection portion. Therefore, the hydrogen generator or its operation method according to Embodiment 1 can reduce the amount of steam in the recycled gas passage more quickly than a case where both the first on-off valve and the second on-off valve are opened, and the material gas is supplied to the recycled gas passage.

Device Configuration

FIG. 1 is a conceptual diagram showing one example of a schematic configuration of a hydrogen generator according to Embodiment 1.

In an example shown in FIG. 1, a hydrogen generator 100 according to the present embodiment includes a reformer 1, a hydro-desulfurizer 2, a first on-off valve 3, a second on-off valve 5, a controller 6, and a recycled gas passage 9.

The reformer 1 generates the hydrogen-containing gas using the material gas. Specifically, the reforming reaction of the material gas is caused in a reforming catalyst portion (not shown) in the reformer 1. Thus, the hydrogen-containing gas is generated. The reforming reaction may be any type of reforming reaction, and examples of the reforming reaction include a steam-reforming reaction, an autothermal reaction, and a partial oxidation reaction. Although not shown in FIG. 1, devices required for each reforming reaction are suitably provided. For example, in a case where the reforming reaction is the steam-reforming reaction, a combustor configured to heat the reforming catalyst portion, an evaporator configured to generate steam, and a water supply unit configured to supply water to the evaporator are provided. In a case where the reforming reaction is the autothermal reaction, an air supply unit (not shown) configured to supply air to the reformer is further provided in the hydrogen generator 100. The material gas is a gas, such as city gas, natural gas, or LPG, containing an organic compound constituted by at least carbon and hydrogen. The city gas contains methane as a major component and is supplied using pipes in cities.

The hydro-desulfurizer 2 removes the sulfur compound in the material gas to be supplied to the reformer 1. The hydro-desulfurizer 2 is configured such that a desulfurizing agent for hydrodesulfurization is filled in a container. The desulfurizing agent for the hydrodesulfurization is constituted by, for example, a CoMo-based catalyst that converts the sulfur compound in the material gas into hydrogen sulfide, and a ZnO-based catalyst or CuZn-based catalyst that is provided downstream of the CoMo-based catalyst and is a sulfur adsorbent that adsorbs and removes the hydrogen sulfide. The desulfurizing agent for the hydrodesulfurization is not limited to this, and may be any agent as long as it has the functions of converting the sulfur compound into the hydrogen sulfide and adsorbing the hydrogen sulfide. For example, the desulfurizing agent may be constituted only by the CuZn-based catalyst.

The hydrogen-containing gas to be added to the material gas to be supplied to the hydro-desulfurizer flows through the recycled gas passage 9.

An upstream end of the recycled gas passage 9 may be connected to any portion as long as it is connected to a passage through which the hydrogen-containing gas discharged from the reformer 1 flows. For example, in a case where a CO reducer configured to reduce carbon monoxide in the hydrogen-containing gas is provided downstream of the reformer 1, the upstream end of the recycled gas passage 9 may be connected to a passage between the reformer 1 and the CO reducer, the CO reducer, or a passage located downstream of the CO reducer. In a case where the CO reducer includes a shift converter configured to reduce carbon monoxide by a shift reaction and a CO remover configured to reduce carbon monoxide by at least one of an oxidation reaction and a methanation reaction, the upstream end of the recycled gas passage 9 may be connected to a passage between the shift converter and the CO remover.

The upstream end of the recycled gas passage 9 may be connected to a passage located downstream of a hydrogen utilizing device configured to utilize the hydrogen-containing gas.

The first on-off valve 3 is disposed on the recycled gas passage 9. The first on-off valve 3 may have any configuration as long as it can close and open the recycled gas passage 9. The first on-off valve 3 may be, for example, a solenoid valve.

The second on-off valve 5 is disposed on the material gas passage located downstream of a connection portion where the material gas passage and the recycled gas passage 9 are connected to each other.

The second on-off valve 5 may have any configuration as long as it can open and close the material gas passage. The second on-off valve 5 may be, for example, a solenoid valve.

The controller 6 is configured to open and close the first on-off valve 3, the second on-off valve 5, and the like, and includes a calculation processing module (not shown), a storage module (not shown) configured to store control programs, and a module configured to transmit and receive control signals. Examples of the calculation processing module include a MPU and a CPU. One example of the storage module is a memory. The controller 6 may be constituted by a single controller configured to perform centralized control or may be constituted by a plurality of controllers which cooperate to perform distributed control.

Operations

Hereinafter, operations of the hydrogen generator 100 will be explained.

Figure 2:
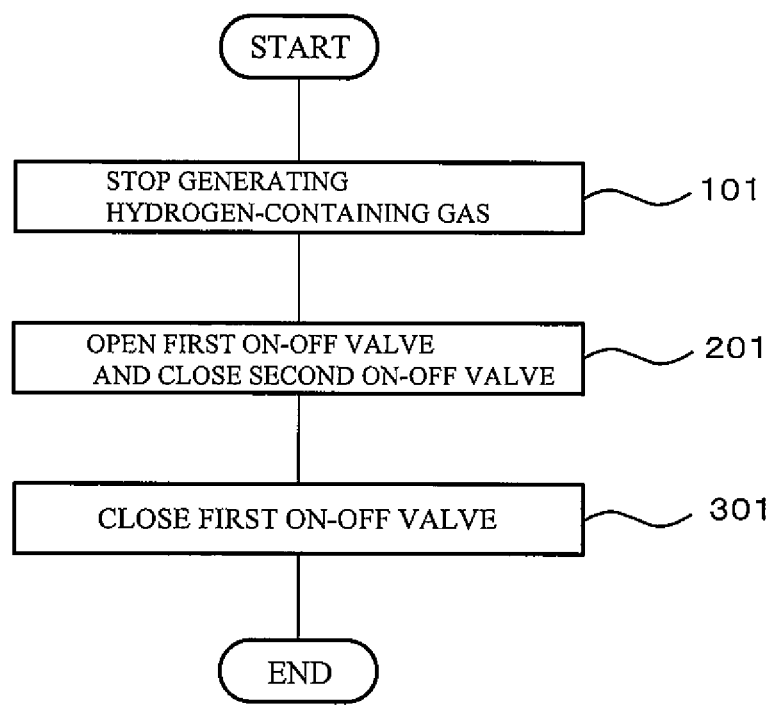
FIG. 2 is a flow chart showing one example of a schematic operation of the hydrogen generator according to Embodiment 1.

FIG. 2 is a flow chart showing one example of a schematic operation of the hydrogen generator according to Embodiment 1. In the hydrogen generator 100, when the hydrogen-containing gas is generated in the reformer 1, the hydrogen-containing gas is caused to continuously flow through the recycled gas passage 9 while supplying the material gas to the reformer 1 with the first on-off valve 3 and the second on-off valve 5 open.

First, in Step S101, the generation of the hydrogen-containing gas by the hydrogen generator 100 is stopped. Here, the supply of at least one of the material gas and the steam to the reformer 1 is stopped. The present embodiment describes a case where the supply of both the material gas and the steam is stopped.

Next, in Step 201, the first on-off valve 3 is opened, and the second on-off valve 5 is closed. Each of a time when the first on-off valve 3 is opened and a time when the second on-off valve 5 is closed may be any time as long as there is a period of time in which the first on-off valve 3 is opened, and the second on-off valve 5 is closed. In a case where the reforming reaction in the reformer 1 is the reforming reaction using steam, an operation of supplying the steam to the reformer 1 is stopped before Step S201.

When the second on-off valve 5 is closed in Step S201, the material gas is not supplied to the reformer 1, so that the hydrogen-containing gas in the reformer 1 is not discharged. In this case, the hydrogen-containing gas flowing through the recycled gas passage 9 stops flowing.

On the other hand, since the first on-off valve 3 is opened, the material gas supplied from a material gas supply source having predetermined supply pressure is supplied to the recycled gas passage 9 through the connection portion where the material gas passage and the recycled gas passage 9 are connected to each other.

Therefore, the amount of condensed water generated in the recycled gas passage 9 is made smaller than those of the conventional hydrogen generators, so that the water clogging of the recycled gas passage 9 is suppressed. The reason for this is as follows.

By supplying the material gas to the recycled gas passage 9 after the generation stop of the hydrogen-containing gas, the hydrogen-containing gas in the recycled gas passage 9 is discharged. With this, the amount of steam contained in the gas in the recycled gas passage 9 decreases. Therefore, the amount of condensed water generated in accordance with the decrease in temperature of the recycled gas passage 9 is made smaller than those of the conventional hydrogen generators. Thus, the water clogging of the recycled gas passage 9 is suppressed.

Moreover, the amount of steam in the recycled gas passage 9 can be reduced more quickly than a case where the second on-off valve 5 is not closed. The reason for this is as follows. In a case where both the first on-off valve 3 and the second on-off valve 5 are opened, and the material gas is supplied to the recycled gas passage 9, the gas having flowed through the reformer 1 is supplied to the recycled gas passage 9. Since the hydrogen-containing gas containing steam exists in the reformer 1, the gas containing steam flows into the recycled gas passage 9. On the other hand, in a case where the first on-off valve 3 is opened, and the second on-off valve 5 is closed, and the material gas is supplied to the recycled gas passage 9, the hydrogen-containing gas having flowed through the reformer 1 does not flow into the recycled gas passage 9, but the material gas flows into the recycled gas passage 9 from the material gas passage through the above connection portion. Therefore, the present embodiment can reduce the amount of steam in the recycled gas passage 9 more quickly than a case where both the first on-off valve 3 and the second on-off valve 5 are opened, and the material gas is supplied to the recycled gas passage 9.

In a case where the material gas is the city gas, the supply pressure of the city gas is gage pressure of 1 to 2.5 kPa. In this case, the dry material gas is supplied to the recycled gas passage 9, and the hydrogen-containing gas containing the stem in the recycled gas passage 9 is discharged from the recycled gas passage 9. The amount of material gas supplied to the recycled gas passage 9 is any amount. For example, a part of the recycled gas passage 9 may be filled with the material gas, or the gas in the recycled gas passage 9 may be replaced with (purged by) the material gas. The amount of gas for purging the recycled gas passage 9 may be equal to or larger than an internal volume of the recycled gas passage 9. In the present embodiment, a gas amount that is three or more times the internal volume is used for the purging.

In the above operation example, the material gas is supplied to the recycled gas passage 9 only by the supply pressure of the material gas supply source. However, a booster (not shown) disposed on the material gas passage and configured to increase the pressure of the material gas may be activated in Step S201. In this case, the booster is disposed on, for example, the material gas passage located upstream of the connection portion where the material gas passage and the recycled gas passage 9 are connected to each other.

The material gas supplied to the recycled gas passage 9 may be the gas having flowed through an absorbent desulfurizer (not shown). The absorbent desulfurizer is a device including a desulfurization catalyst for adsorbing and removing the sulfur compound in the material gas by physical adsorption. When the hydrogen generator is operating, the sulfur compound in the material gas is removed by the hydro-desulfurizer 2. However, a sulfur constituent of the material gas that is not caused to flow through the hydro-desulfurizer 2 or the material gas when the hydrogen-containing gas is not flowing through the recycled gas passage 9 may be removed by the absorbent desulfurizer.

With this, the material gas from which the sulfur constituent is removed is supplied to the recycled gas passage 9. Therefore, the deterioration of the reforming catalyst by the sulfur when the material gas remaining in the recycled gas passage 9 flows into the reformer 1 at the time of restart is suppressed.

Next, in Step 301, the first on-off valve 3 is closed after the supply of the material gas to the recycled gas passage 9 is completed. Thus, the supply of the material gas to the recycled gas passage 9 is stopped.

Embodiment 2

The hydrogen generator according to Embodiment 2 is configured such that the hydrogen generator according to Embodiment 1 further includes a processor configured to dilute a combustible gas discharged from a gas passage located downstream of the reformer when the material gas is being supplied to the recycled gas passage by the controller.

The method of operating the hydrogen generator according to Embodiment 2 is configured such that the method of operating the hydrogen generator according to Embodiment 1 further includes diluting a combustible gas discharged from a gas passage located downstream of the reformer when the first on-off valve is opened, and the material gas is being supplied to the recycled gas passage.

According to this configuration, a possibility of discharging the combustible gas, which is in a combustible range, to the outside of the device is made lower than a case where the combustible gas discharged from the gas passage located downstream of the reformer is not diluted.

The hydrogen generator and its operating method according to the present embodiment may be configured in the same manner as those according to Embodiment 1 except for the above features.

Device Configuration

Figure 3:
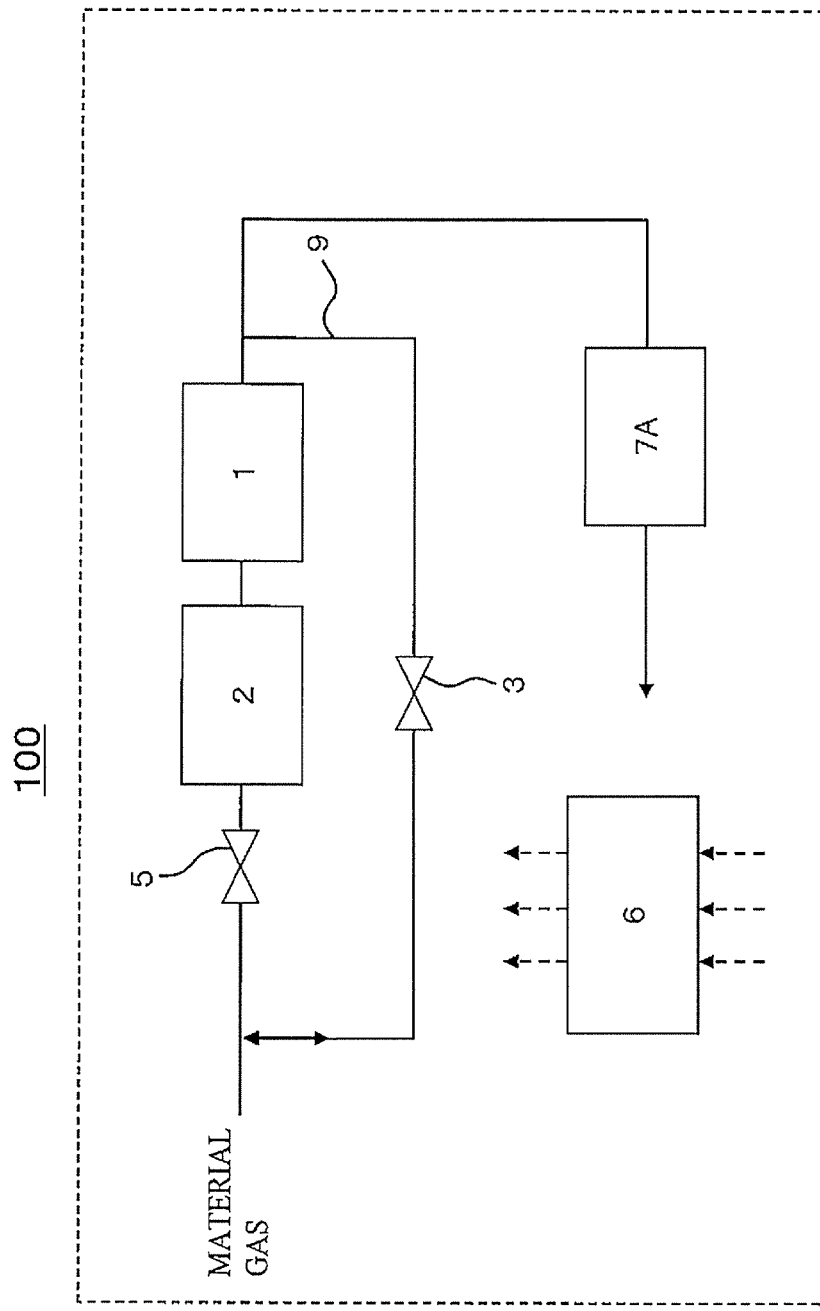
FIG. 3 is a conceptual diagram showing one example of a schematic configuration of the hydrogen generator according to Embodiment 2.

FIG. 3 is a conceptual diagram showing one example of a schematic configuration of the hydrogen generator according to Embodiment 2.

As shown in FIG. 3, the hydrogen generator 100 according to the present embodiment includes the reformer 1, the hydro-desulfurizer 2, the first on-off valve 3, the second on-off valve 5, the controller 6, a processor 7A, and the recycled gas passage 9.

Since the reformer 1, the hydro-desulfurizer 2, the first on-off valve 3, the second on-off valve 5, the controller 6, and the recycled gas passage 9 are the same as those according to Embodiment 1, explanations thereof are omitted.

The processor 7A is a device configured to dilute and discharge the combustible gas. The processor 7A includes an air supply unit (not shown) and dilutes the supplied combustible gas by air supplied from the air supply unit such that the combustible gas falls below the combustible range. Various devices, such as a fan, a pump, and a blower may be used as the air supply unit, and the air supply unit may be any device as long as it can supply air. In the present embodiment, a combustor (not shown) provided to heat the reformer 1 is used as the processor 7A. While the hydrogen generator 100 is generating the hydrogen-containing gas, the processor 7A causes a combustion reaction between the combustible gas and the air as the combustor. When the material gas is supplied to the recycled gas passage 9 after the generation stop of the hydrogen-containing gas, the processor 7A dilutes the combustible gas, flowing into the combustor, by the air. A combustion fan is used as the air supply unit.

Operations

Hereinafter, operations of the hydrogen generator 100 will be explained.

The operations of the hydrogen generator according to the present embodiment are the same as those of the hydrogen generator according to Embodiment 1 except for the following operations of the processor 7A. Therefore, the features will be explained in reference to FIG. 2.

In Step 201, the combustible gas discharged from the gas passage located downstream of the reformer 1 is diluted and discharged by the air supplied by the combustion fan.

Here, the state of the discharged gas changes as follows depending on how to adjust the amount of air supplied by the combustion fan. First, in a case where the amount of air supplied by the combustion fan is increased before the generation stop of the hydrogen-containing gas in the reformer 1, the state of the discharged gas changes from a state where the combustible gas is combusted and discharged to a state where the combustible gas is diluted and discharged in the middle of the generation of the hydrogen-containing gas. After that, the combustible gas is continuously diluted and discharged while the material gas is being supplied to the recycled gas passage 9.

The following will describe a case where the amount of air supplied by the combustion fan is increased in accordance with the generation stop of the hydrogen-containing gas in the reformer 1. The generation of the hydrogen-containing gas has a time-lag relative to the supply of the material gas. Therefore, the hydrogen-containing gas is supplied to a combustion burner for a while even after the supply stop of the material gas. On this account, the hydrogen-containing gas generated late and the combustible gas flowed into the combustor in accordance with the supply of the material gas to the recycled gas passage 9 are diluted and discharged by the combustion fan.

Lastly, a case where the amount of air supplied by the combustion fan is increased after the generation of the hydrogen-containing gas in the reformer 1 is stopped, and the flow of the hydrogen-containing gas into the combustor is stopped will be described. The hydrogen-containing gas is completely combusted in the combustion burner, and the combustible gas flowed into the combustor in accordance with the supply of the material gas to the recycled gas passage 9 is diluted and discharged after a part thereof is combusted.

As long as the gas is safely combusted or diluted, and discharged, and the gas in the combustible range is not discharged, any method may be used.

Next, in Step 301, the first on-off valve 3 is closed after the purging of the recycled gas passage 9 is completed. After the discharge of the material gas is finished, the combustible gas in the processor 7A and subsequent pipes is diluted by the air supplied by the combustion fan. When the combustible gas is adequately discharged, the supply of the air by the combustion fan is stopped. In a case where the concentration of the combustible gas remaining in the processor 7A and subsequent pipes is adequately lower than the combustible range, the combustion fan may be stopped at the above time.

Modification Example 1

The hydrogen generator according to Modification Example 1 of Embodiment 2 is configured such that the hydrogen generator according to any one of Embodiments 1 and 2 further includes a processor configured to combust a combustible gas discharged from a gas passage located downstream of the reformer when the first on-off valve is opened, and the material gas is being supplied to the recycled gas passage.

The method of operating the hydrogen generator according to Modification Example 1 of Embodiment 2 is configured such that the method of operating the hydrogen generator according to any one of Embodiments 1 and 2 includes combusting a combustible gas discharged from a gas passage located downstream of the reformer when the first on-off valve is opened, and the material gas is being supplied to the recycled gas passage.

According to this configuration, a possibility of discharging the combustible gas, which is in the combustible range, to the outside of the device is made lower than a case where the combustible gas discharged from the gas passage located downstream of the reformer is not combusted.

The hydrogen generator and its operating method according to the present modification example may be configured in the same manner as those according to Embodiment 2 except for the above features.

Figure 4:
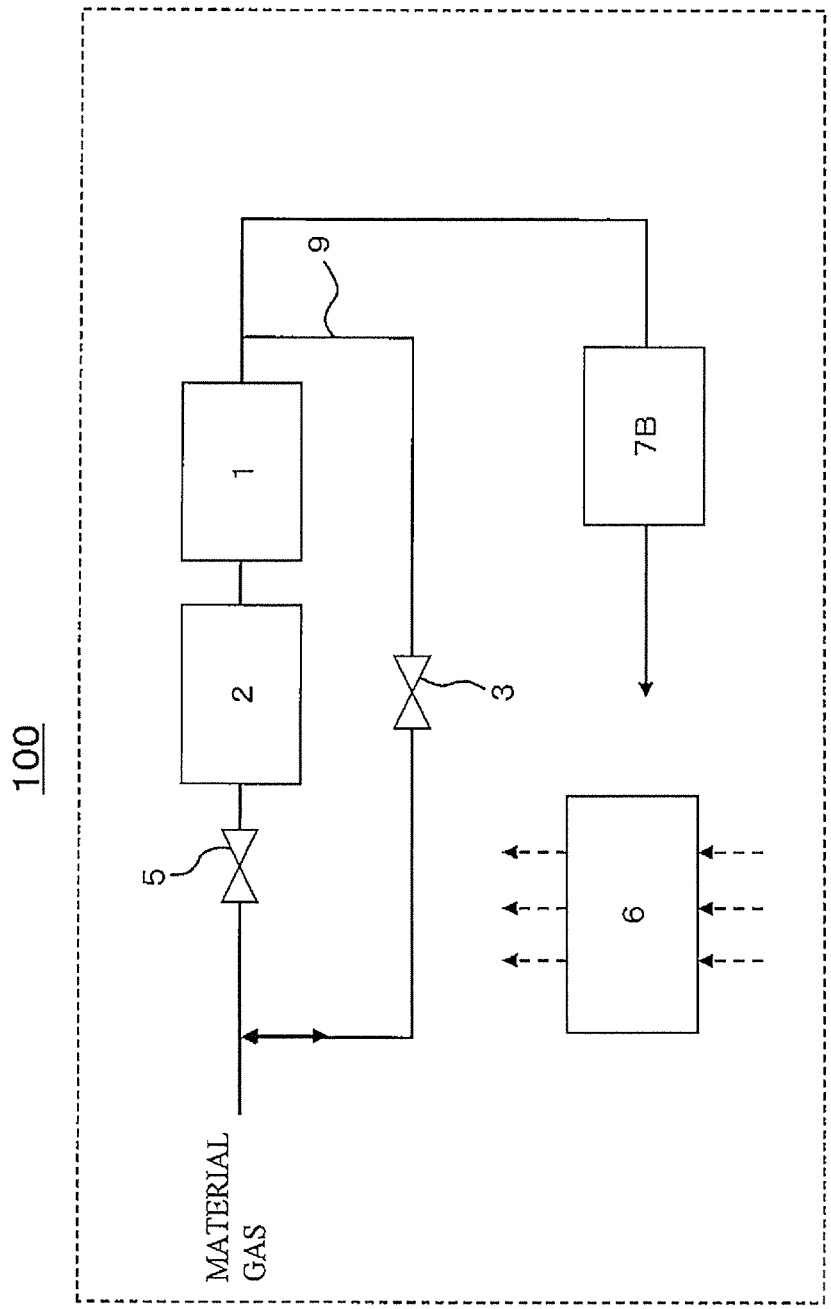
FIG. 4 is a conceptual diagram showing one example of a schematic configuration of the hydrogen generator according to Modification Example 1 of Embodiment 2.

FIG. 4 is a conceptual diagram showing one example of a schematic configuration of the hydrogen generator according to Modification Example 1 of Embodiment 2.

As shown in FIG. 4, the hydrogen generator 100 according to the present modification example includes the reformer 1, the hydro-desulfurizer 2, the first on-off valve 3, the second on-off valve 5, the controller 6, a processor 7B, and the recycled gas passage 9.

Since the reformer 1, the hydro-desulfurizer 2, the first on-off valve 3, the second on-off valve 5, the controller 6, and the recycled gas passage 9 are the same as those according to Embodiment 1, explanations thereof are omitted.

The processor 7B combusts the combustible gas discharged from the gas passage located downstream of the reformer 1. For example, a combustor may be used as the processor 7B.

By adjusting the amount of air supplied by the combustion fan at a time when the second on-off valve 5 is closed to stop the supply of the material gas to the reformer 1, and the first on-off valve 3 is opened to supply the material gas to the recycled gas passage 9, the combustion of the combustible gas in the combustor is continued.

The amount of air supplied by the combustion fan changes depending on the flow rate of the material gas supplied to the recycled gas passage 9. In the present embodiment, the amount of combustible gas processed when the hydrogen-containing gas is being generated by the reformer 1 is larger than that processed when the material gas is being supplied to the recycled gas passage 9. Therefore, the amount of air supplied by the combustion fan needs to be made smaller in the case of combusting the combustible gas flowed into the combustor when the material gas is being supplied to the recycled gas passage 9. Since the flow rate of the material gas supplied to the recycled gas passage 9 differs depending on device configurations, the flow rate of the air needs to be controlled depending on the flow rate of the material gas.

Embodiment 3

The hydrogen generator according to Embodiment 3 is configured such that in the hydrogen generator according to any one of Embodiments 1 and 2 and Modification Example of Embodiment 2, before a first operation of replacing a gas in the reformer with the material gas, the controller opens the first on-off valve to supply the material gas to the recycled gas passage.

The method of operating the hydrogen generator according to Embodiment 3 is configured such that in the method of operating the hydrogen generator according to any one of Embodiments 1 and 2 and Modification Example of Embodiment 2, before a first operation of replacing a gas in the reformer with the material gas, the first on-off valve is opened, and the material gas is supplied to the recycled gas passage.

According to this configuration, the amount of condensed water generated in the recycled gas passage can be made smaller than a case where the material gas is supplied to the recycled gas passage after the first operation.

Typically, the replacement of the gas in the reformer with the material gas is performed in a state where the temperature in the reformer is lowered to a temperature at which carbon deposition from the material gas does not occur. Therefore, at a time when the gas in the reformer is replaced with the material gas, the condensed water may have been generated in the recycled gas passage that is lower in temperature than the reformer.

Therefore, according to the above configuration, the amount of condensed water generated in the recycled gas passage can be made smaller than a case where the material gas is supplied to the recycled gas passage after the first operation.

The hydrogen generator and its operating method according to the present embodiment may be configured in the same manner as the hydrogen generator according to Embodiment 1, Embodiment 2, or Modification Example 1 of Embodiment 2 except for the above features.

Device Configuration

The hydrogen generator 100 according to the present embodiment is the same in configuration as that shown in FIG. 1 and includes the reformer 1, the hydro-desulfurizer 2, the first on-off valve 3, the second on-off valve 5, the controller 6, and the recycled gas passage 9. Since the configuration of the hydrogen generator 100 according to the present embodiment is the same as that according to Embodiment 1, an explanation thereof is omitted.

Operations

Hereinafter, operations of the hydrogen generator 100 will be explained.

Figure 5:
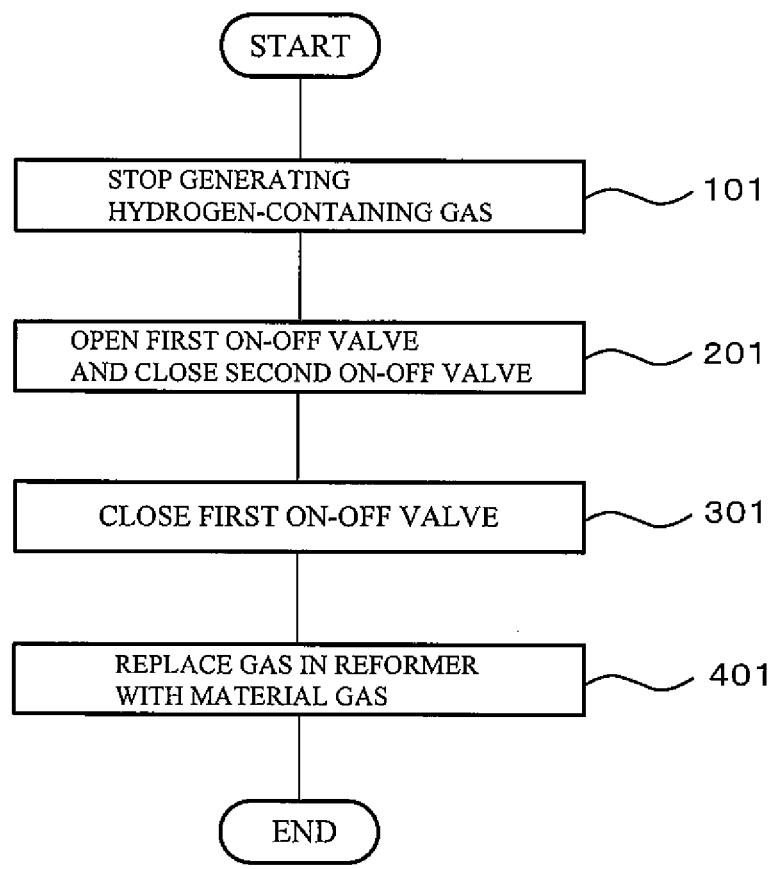
FIG. 5 is a flow chart showing one example of a schematic operation of the hydrogen generator according to Embodiment 3.

FIG. 5 is a flow chart showing one example of a schematic operation of the hydrogen generator according to Embodiment 3. As with Embodiments 1 and 2, the hydrogen generator 100 performs Steps 101, 201, and 301 when stopping the operation, and then stops the operation. In this stop state, the gas containing steam is still remaining in the reformer 1. If this state is continued, the reformer 1 decreases in temperature by heat release. If the temperature of the reformer 1 decreases to a temperature at which the steam in the reformer 1 condenses, the water is generated in the reformer 1. With this, the performance of the catalyst, such as the reforming catalyst, in the reformer 1 deteriorates, or the catalyst breaks. Thus, the catalyst deteriorates. Here, by opening the second on-off valve 5 before the temperature of the reformer 1 decreases to a temperature at which the steam condenses, the gas containing the steam in the reformer 1 is replaced with the material gas. Thus, the deterioration of the catalyst in the reformer 1 can be suppressed (Step 401).

In Step 401, the decrease in temperature of the reformer 1 can be detected by a detector (not shown) configured to directly or indirectly detect the temperature of the reformer 1. Examples of the detector configured to indirectly detect the temperature of the reformer 1 include a timer unit configured to detect an elapsed time from the generation stop of the hydrogen-containing gas and a pressure detector configured to detect pressure in the reformer 1 in a case where the gas passage located downstream of the reformer 1 is closed in accordance with the generation stop of the hydrogen-containing gas.

Modification Example 1

The hydrogen generator according to Modification Example 1 of Embodiment 3 is configured such that in the hydrogen generator according to any one of Embodiment 1, Embodiment 2, Modification Example of Embodiment 2, and Embodiment 3, before a second operation of supplying the material gas to a gas passage including the reformer so as to compensate for gas contraction in the reformer or an internal pressure decrease in the reformer by a temperature decrease in the reformer, the controller opens the first on-off valve to supply the material gas to the recycled gas passage.

The method of operating the hydrogen generator according to Modification Example 1 of Embodiment 3 is configured such that in the method of operating the hydrogen generator according to any one of Embodiment 1, Embodiment 2, Modification Example of Embodiment 2, and Embodiment 3, before a second operation of supplying the material gas to a gas passage including the reformer so as to compensate for gas contraction in the reformer or an internal pressure decrease in the reformer by a temperature decrease in the reformer, the first on-off valve is opened, and the material gas is supplied to the recycled gas passage.

According to this configuration, the amount of condensed water generated in the recycled gas passage can be made smaller than a case where the material gas is supplied to the recycled gas passage after the second operation.

Typically, the supply of the material gas to compensate for the contraction of the gas in the reformer or the decrease in internal pressure of the reformer is performed in a state where the temperature in the reformer is lowered to a temperature at which the contraction of the gas in the reformer or the decrease in internal pressure of the reformer occurs. At a time when the supply of the material gas to the reformer starts, the condensed water may have been generated in the recycled gas passage that is lower in temperature than the reformer.

Therefore, according to the above configuration, the amount of condensed water generated in the recycled gas passage can be made smaller than a case where the material gas is supplied to the recycled gas passage after the second operation.

The hydrogen generator and its operating method according to the present modification example may be configured in the same manner as those according to Embodiment 1, Embodiment 2, Modification Example of Embodiment 2, or Embodiment 3 except for the above features.

Device Configuration

The hydrogen generator 100 according to the present modification example is the same in configuration as that shown in FIG. 1 and includes the reformer 1, the hydro-desulfurizer 2, the first on-off valve 3, the second on-off valve 5, the controller 6, and the recycled gas passage 9. Since the hydrogen generator 100 according to the present modification example is the same in configuration as that according to Embodiment 1, an explanation thereof is omitted.

Operations

Figure 6:
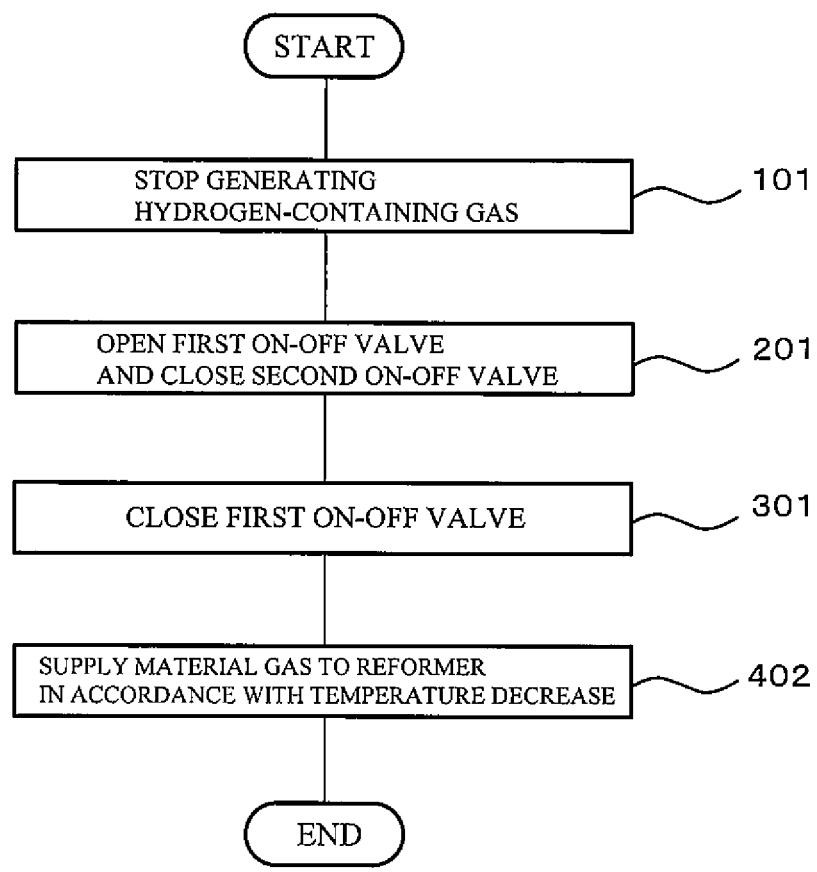
FIG. 6 is a flow chart showing one example of a schematic operation of the hydrogen generator according to Modification Example 1 of Embodiment 3.

FIG. 6 is a flow chart showing one example of a schematic operation of the hydrogen generator according to Modification Example 1 of Embodiment 3.

As shown in FIG. 6, as with Embodiments 1 and 2, the hydrogen generator 100 performs Steps 101, 201, and 301 when stopping the operation, and then stops the operation.

The reformer 1 is high in temperature immediately after the stop. For example, since the steam-reforming reaction by the reforming catalyst is performed at about 600° C., the temperature of the reformer 1 is around this temperature immediately after the stop. Then, the reformer 1 decreases in temperature by heat release.

Here, in a case where the gas passage located downstream of the reformer 1 is open to the atmosphere, and the reformer 1 decreases in temperature, the gas in the reformer 1 contracts, so that the air flows into the reformer 1 through the above gas passage. If the air flows into the reformer, there is a possibility that the reforming catalyst and the like deteriorate.

In a case where the gas passage located downstream of the reformer 1 is sealed, and the reformer 1 decreases in temperature, the pressure in the reformer 1 decreases. If the pressure in the reformer 1 decreases too much, there is a possibility that the structure of the reformer 1 cannot withstand the pressure decrease and breaks, or a solenoid valve configured to seal the reformer 1, or the like cannot withstand the negative pressure and opens, and as a result, the reformer 1 suctions the air from outside. If the air gets into the reformer 1, the oxidative degradation of the catalyst occurs, so that the performance of the catalyst deteriorates.

Here, to prevent this problem, in Step 402, the material gas is supplied to the gas passage including the reformer 1 in accordance with the decrease in temperature of the reformer 1. With this, the gas contraction or internal pressure decrease in the reformer 1 by the decrease in temperature of the reformer 1 is compensated. In Step S402, specifically, the first on-off valve 3 may be opened. With this, at least one of the recycled gas passage 9 and the second on-off valve 5 is opened. In a case where the second on-off valve 5 is opened, there is a possibility that the hydrogen-containing gas containing steam flows into the recycled gas passage 9 through the gas passage located downstream of the reformer 1 and connected to the upstream end of the recycled gas passage 9, and the condensed water is generated in the recycled gas passage 9. The generation of the condensed water can be suppressed by opening the first on-off valve 3 to supply the material gas through the recycled gas passage 9 to the gas passage located downstream of the reformer 1.

In Step 402, the decrease in temperature of the reformer 1 can be detected by a detector (not shown) configured to directly or indirectly detect the temperature of the reformer 1. Examples of the detector configured to indirectly detect the temperature of the reformer 1 include a timer unit configured to detect an elapsed time from the generation stop of the hydrogen-containing gas and a pressure detector configured to detect pressure in the reformer 1 in a case where the gas passage located downstream of the reformer 1 is closed in accordance with the generation stop of the hydrogen-containing gas.

Embodiment 4

The hydrogen generator according to Embodiment 4 is configured such that the hydrogen generator according to any one of Embodiment 1, Embodiment 2, Modification Example 1 of Embodiment 2, Embodiment 3, and Modification Example 1 of Embodiment 3 further includes a booster disposed on the material gas passage extending from the connection portion where the material gas passage and the recycled gas passage are connected to each other to the second on-off valve, wherein the controller does not activate the booster but opens the first on-off valve to supply the material gas to the recycled gas passage.

The method of operating the hydrogen generator according to Embodiment 4 is configured such that in the method of operating the hydrogen generator according to any one of Embodiment 1, Embodiment 2, Modification Example 1 of Embodiment 2, Embodiment 3, and Modification Example 1 of Embodiment 3, a booster disposed on the material gas passage extending from the connection portion where the material gas passage and the recycled gas passage are connected to each other to the second on-off valve is not activated, the first on-off valve is opened, and the material gas is supplied to the recycled gas passage.

The hydrogen generator and its operating method according to the present embodiment may be configured in the same manner as the hydrogen generator according to Embodiment 1, Embodiment 2, Modification Example 1 of Embodiment 2, Embodiment 3, or Modification Example 1 of Embodiment 2 except for the above features.

Device Configuration

Figure 7:
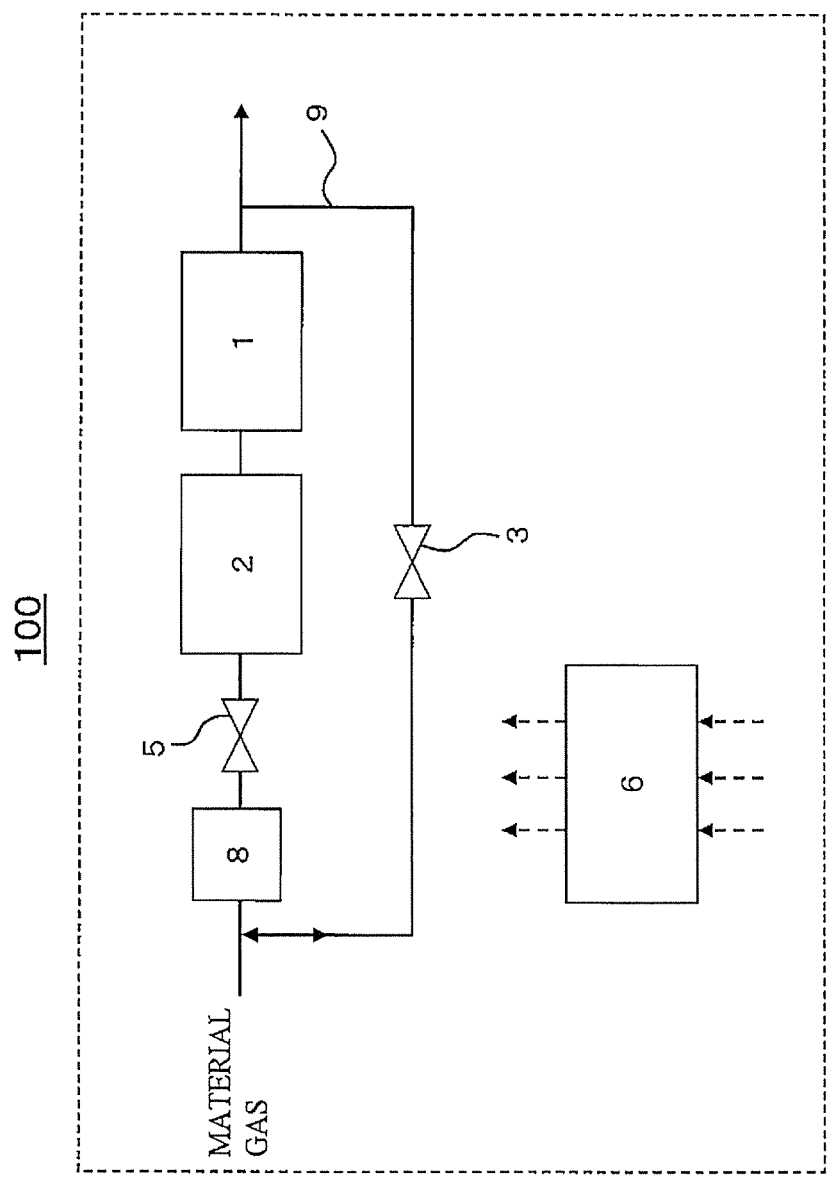
FIG. 7 is a conceptual diagram showing one example of a schematic configuration of the hydrogen generator according to Embodiment 4.

FIG. 7 is a conceptual diagram showing one example of a schematic configuration of the hydrogen generator according to Embodiment 4.

In the example shown in FIG. 7, the hydrogen generator 100 according to the present embodiment includes the reformer 1, the hydro-desulfurizer 2, the first on-off valve 3, the second on-off valve 5, the controller 6, a booster 8, and the recycled gas passage 9.

Since the reformer 1, the hydro-desulfurizer 2, the first on-off valve 3, the second on-off valve 5, the controller 6, and the recycled gas passage 9 are the same as those according to Embodiment 1, explanations thereof are omitted.

The booster 8 is disposed on the material gas passage extending from a connection portion where the material gas passage and the recycled gas passage 9 are connected to each other to the second on-off valve 5. The booster 8 increases the pressure of the material gas to be supplied to the reformer 1.

Examples of the booster 8 include a diaphragm pump and a booster pump. The booster 8 may be any device as long as it can increase the pressure of the material gas to be supplied to the reformer 1. The booster 8 is not limited to the above.

Operations

Hereinafter, operations of the hydrogen generator 100 will be explained.

Figure 8:
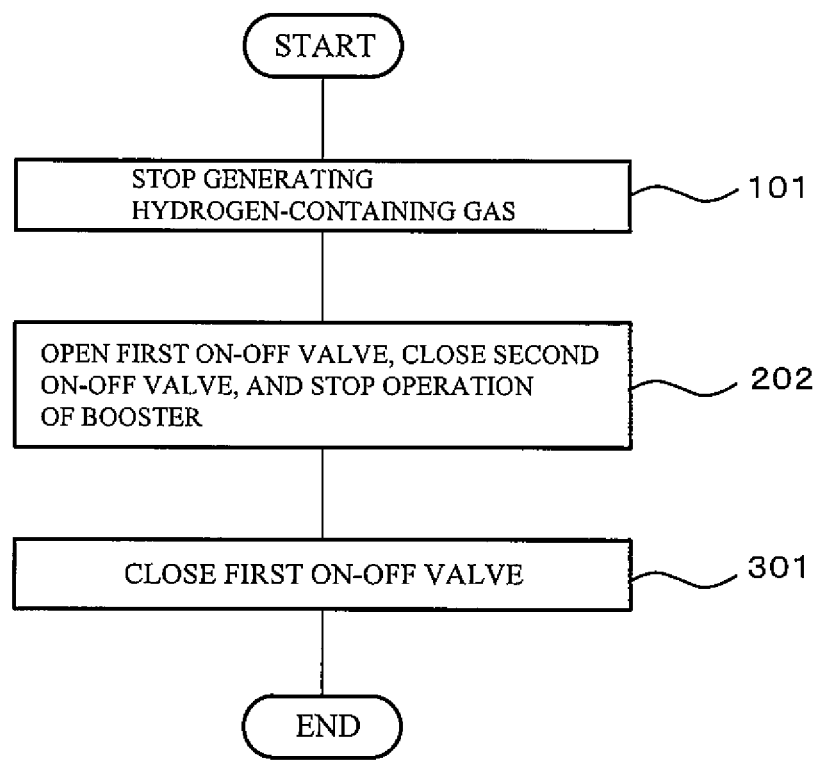
FIG. 8 is a flow chart showing one example of a schematic operation of the hydrogen generator according to Embodiment 4.

Explanations of the same operations of the hydrogen generator according to the present embodiment as the hydrogen generator according to Embodiment 1, Embodiment 2, Modification Example 1 of Embodiment 2, Embodiment 3, or Modification Example 1 of Embodiment 3 are omitted, and operations that are the features of the present embodiment will be explained in reference to FIG. 8.

In Step 202, the operation of the booster 8 is stopped when the second on-off valve 5 is closed. In a case where the booster 8 is continuously operated with the second on-off valve 5 closed, the booster 8 keeps applying the supply pressure of the material gas to a seal mechanism of the second on-off valve 5. In this case, there is a possibility that the second on-off valve 5 is broken, or the booster 8 breaks down.

Therefore, in the hydrogen generator 100 according to the present embodiment, the operation of the booster 8 is stopped when the second on-off valve 5 is closed in Step S202.

Even if the operation of the booster 8 is stopped, the first on-off valve 3 is open, so that the material gas is supplied to the recycled gas passage 9 from the material gas supply source having predetermined supply pressure. In a case where the material gas is the city gas, the supply pressure of the city gas is gage pressure of 1 to 2.5 kPa.

Embodiment 5

A fuel cell system according to Embodiment 5 includes the hydrogen generator according to any one of Embodiment 1, Embodiment 2, Modification Example 1 of Embodiment 2, Embodiment 3, Modification Example 1 of Embodiment 3, and Embodiment 4 and a fuel cell configured to generate electric power using the hydrogen-containing gas supplied from the hydrogen generator.

According to this configuration, the amount of condensed water generated in the recycled gas passage is made smaller than those of conventional cases. Thus, the water clogging of the recycled gas passage is suppressed.

Figure 9:
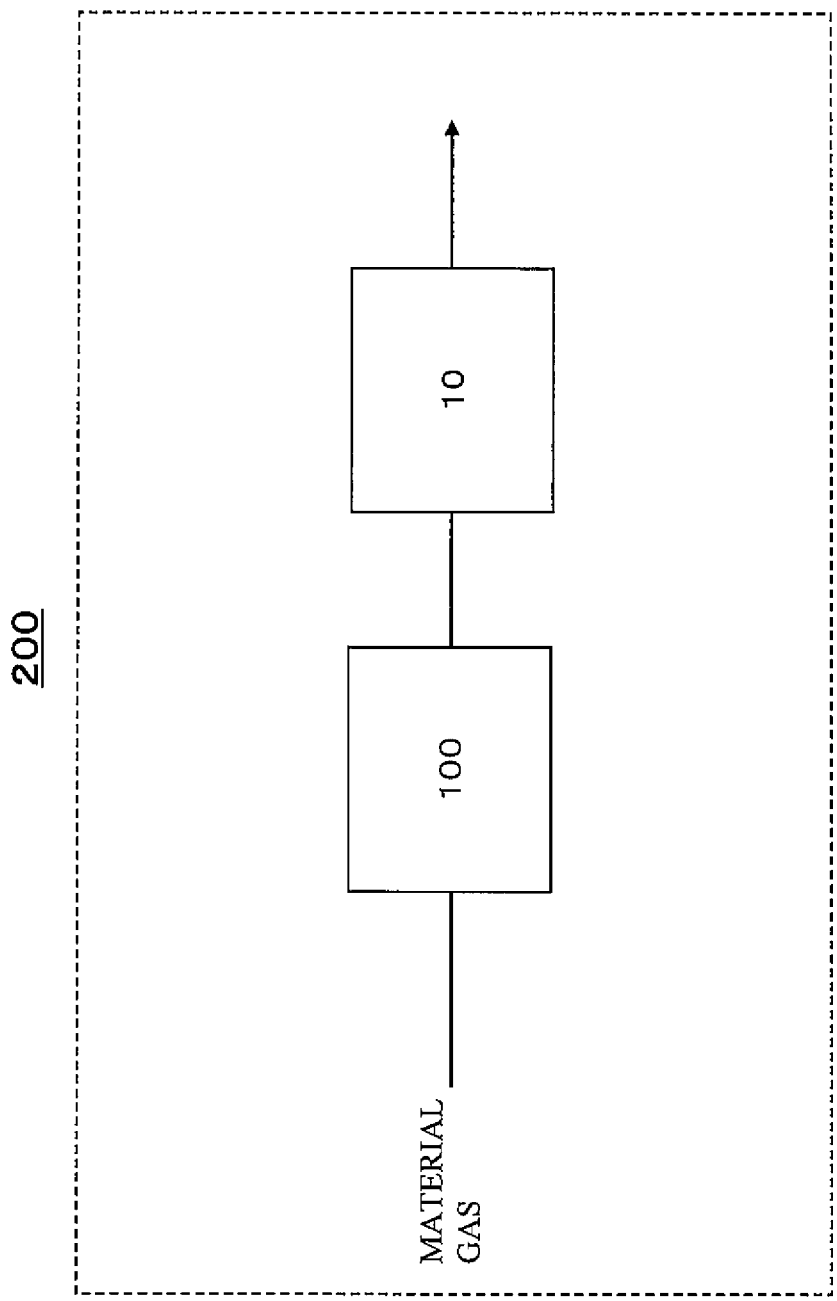
FIG. 9 is a conceptual diagram showing one example of a schematic configuration of a fuel cell system according to Embodiment 5.

FIG. 9 is a conceptual diagram showing one example of a schematic configuration of the fuel cell system according to Embodiment 5.

In the example shown in FIG. 9, a fuel cell system 200 according to the present embodiment includes the hydrogen generator 100 according to Embodiment 1 and a fuel cell 10.

The fuel cell 10 is a fuel cell configured to generate electric power using the hydrogen-containing gas supplied from the hydrogen generator 100. The fuel cell 10 may be any type of fuel cell. Examples of the fuel cell 10 include a polymer electrolyte fuel cell (PEFC), a solid-oxide fuel cell, and a phosphoric acid fuel cell.

At the time of the electric power generating operation, the fuel cell system 200 generates electric power using the hydrogen-containing gas supplied from the hydrogen generator 100. Since the operations of the hydrogen generator 100 according to the present embodiment are the same as those according to Embodiment 1, detailed explanations thereof are omitted.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

According to one aspect of the present invention, the amount of condensed water generated in the recycled gas passage is made smaller than those of conventional cases, so that the water clogging of the recycled gas passage is suppressed. Therefore, one aspect of the present invention is useful as the hydrogen generator and the fuel cell system.

REFERENCE SIGNS LIST 1 reformer
2 hydro-desulfurizer
3 first on-off valve
5 second on-off valve
6 controller
7A processor
7B processor
8 booster
9 recycled gas passage
10 fuel cell
100 hydrogen generator
200 fuel cell system

The invention claimed is:

1. A hydrogen generator comprising:
a reformer configured to generate a hydrogen-containing gas by a reforming reaction using a material gas;
a hydro-desulfurizer configured to remove a sulfur compound in the material gas;
a material gas passage through which the material gas supplied to the reformer flows;
a recycled gas passage connected between a first connection portion of a gas passage located downstream of the reformer and a second connection portion of the material gas passage located upstream of the hydro-desulfurizer;
a first on-off valve disposed on the recycled gas passage;
a second on-off valve disposed on the material gas passage between the second connection portion and the hydro-desulfurizer; and
a controller configured to open the first on-off valve, after generation stop of the hydrogen-containing gas, to supply the material gas to the recycled gas passage, and to close the second on-off valve when the controller opens the first on-off valve.

2. The hydrogen generator according to claim 1, further comprising a processor configured to dilute a combustible gas discharged from the gas passage located downstream of the reformer when the material gas is being supplied to the recycled gas passage by the controller.

3. The hydrogen generator according to claim 1, further comprising a processor configured to combust a combustible gas discharged from the gas passage located downstream of the reformer when the first on-off valve is opened, and the material gas is being supplied to the recycled gas passage.

4. The hydrogen generator according to claim 1, wherein before a first operation of replacing a gas in the reformer with the material gas, the controller opens the first on-off valve to supply the material gas to the recycled gas passage.

5. The hydrogen generator according to claim 1, wherein before a second operation of supplying the material gas to a gas passage including the reformer so as to compensate for gas contraction in the reformer or an internal pressure decrease in the reformer by a temperature decrease in the reformer, the controller opens the first on-off valve to supply the material gas to the recycled gas passage.

6. The hydrogen generator according to claim 1, further comprising a booster disposed on the material gas passage extending from the second connection portion to the second on-off valve,
wherein the controller does not activate the booster but opens the first on-off valve to supply the material gas to the recycled gas passage.

7. A fuel cell system comprising:
the hydrogen generator according to claim 1; and
a fuel cell configured to generate electric power using the hydrogen-containing gas supplied from the hydrogen generator.

8. The hydrogen generator according to claim 1, wherein:
the controller includes:
a calculation processing module; and
a storage module configured to store a control program, and
the control program, when executed by the calculation processing module, causes the controller to open the first on-off valve, after generation stop of the hydrogen-containing gas, to supply the material gas to the recycled gas passage, and to close the second on-off valve when the controller opens the first on-off valve.

9. A method of operating a hydrogen generator, comprising:
generating a hydrogen-containing gas in a reformer by a reforming reaction using a material gas;
supplying the hydrogen-containing gas generated by the reformer to a hydro-desulfurizer through a recycled gas passage;
removing a sulfur compound from the material gas to which the hydrogen-containing gas, which is supplied through the recycled gas passage, is added, by the hydro-desulfurizer;
stopping generating the hydrogen-containing gas; and
opening a first on-off valve disposed on the recycled gas passage, after the stopping generating the hydrogen-containing gas, to supply the material gas to the recycled gas passage, wherein:

the recycled gas passage is connected between a first connection portion of a gas passage located downstream of the reformer and a second connection portion of a material gas passage, through which the material gas supplied to the reformer flows, located upstream of the hydro-desulfurizer, a second on-off valve is disposed on the material gas passage between the second connection portion and the hydro-desulfurizer, and when the first on-off valve is opened, the second on-off valve is closed.

10. The method according to claim 9, further comprising diluting a combustible gas discharged from a gas passage located downstream of the reformer when the first on-off valve is opened, and the material gas is being supplied to the recycled gas passage.

11. The method according to claim 10, wherein before a first operation of replacing a gas in the reformer with the material gas, the first on-off valve is opened, and the material gas is supplied to the recycled gas passage.

12. The method according to claim 10, before a second operation of supplying the material gas to a gas passage including the reformer so as to compensate for gas contraction in the reformer or an internal pressure decrease in the reformer by a temperature decrease in the reformer, the first on-off valve is opened, and the material gas is supplied to the recycled gas passage.

13. The method according to claim 10, wherein:

a booster disposed on the material gas passage extending from the second connection portion to the second on-off valve is not activated;

the first on-off valve is opened; and the material gas is supplied to the recycled gas passage.

14. The method according to claim 9, further comprising combusting a combustible gas discharged from a gas passage located downstream of the reformer when the first on-off valve is opened, and the material gas is being supplied to the recycled gas passage.

* * * * *